United States Patent [19]
Brooks

[11] Patent Number: 5,845,310
[45] Date of Patent: Dec. 1, 1998

[54] SYSTEM AND METHODS FOR PERFORMING CACHE LATENCY DIAGNOSTICS IN SCALABLE PARALLEL PROCESSING ARCHITECTURES INCLUDING CALCULATING CPU IDLE TIME AND COUNTING NUMBER OF CACHE MISSES

[75] Inventor: Gary S. Brooks, Plano, Tex.

[73] Assignee: Hewlett-Packard Co., Palo Alto, Calif.

[21] Appl. No.: 663,872

[22] Filed: Jun. 19, 1996

Related U.S. Application Data

[63] Continuation of Ser. No. 168,083, Dec. 15, 1993, abandoned.

[51] Int. Cl.[6] ............................. G06F 12/00; G06F 13/00
[52] U.S. Cl. ............................. 711/3; 711/118; 711/154; 711/167; 395/183.22; 395/838
[58] Field of Search .......................... 364/DIG. 1, 243.4; 395/183.21, 183.22, 403, 445, 650, 837, 838, 481, 494; 711/3, 118, 154, 167

[56] References Cited

U.S. PATENT DOCUMENTS

| | | | |
|---|---|---|---|
| 4,464,712 | 8/1984 | Fletcher | 395/425 |
| 4,885,680 | 12/1989 | Anthony et al. | 395/425 |
| 5,072,376 | 12/1991 | Ellsworth | 395/650 |
| 5,072,418 | 12/1991 | Boutaud et al. | 364/715.06 |
| 5,097,437 | 3/1992 | Larson | 395/595 |
| 5,239,641 | 8/1993 | Horst | 395/553 |
| 5,247,653 | 9/1993 | Hung | 395/500 |
| 5,287,508 | 2/1994 | Hejna, Jr. et al. | 395/650 |
| 5,325,499 | 6/1994 | Kummer et al. | 395/425 |
| 5,361,391 | 11/1994 | Westberg | 395/464 |
| 5,384,906 | 1/1995 | Horst | 395/553 |
| 5,386,526 | 1/1995 | Mitra et al. | 395/403 |
| 5,392,436 | 2/1995 | Jansen et al. | 395/725 |
| 5,398,325 | 3/1995 | Chang et al. | 395/403 |
| 5,463,775 | 10/1995 | DeWitt et al. | 395/184.01 |
| 5,537,541 | 7/1996 | Wibecan | 395/183.21 |
| 5,581,745 | 12/1996 | Mukaoka | 395/557 |

OTHER PUBLICATIONS

*Design of the Standord DASH Multiprocessor*, Daniel Lenoski et al, Computer Systems Laboratory, Stanford University, Dec. 1989.
*The Directory–Based Cache Coherence Protocol for the DASH Microprocessor*, Daniel Lenoski, et al, Computer Systems Laboratory, Stanford University, Dec. 1989.
*Memory Consistency and Event Ordering in Scalable Shared–Memory Multiprocessors*, Kourosh Gharachorloo, Computer Systems Library, Stanford University, Mar. 1993.
*The Design and Analysis of DASH: A Scalable Directory–Based Multiprocessor*, Daniel Lenoski, Dec. 1991.

*Primary Examiner*—Tod R. Swann
*Assistant Examiner*—Tuan V. Thai

[57] ABSTRACT

An integrated diagnostics system within a processing system for monitoring and identifying performance problems within the processing system. The processing system including at least one processor and at least one memory unit, wherein the processor is operable to read one or more addressable memory locations within the memory unit. The integrated diagnostics system including an integrated monitor for counting cache misses and idle time suffered by the processor waiting to read a first addressable memory location within the memory unit.

19 Claims, 4 Drawing Sheets

SYSTEM AND METHODS FOR PERFORMING CACHE LATENCY DIAGNOSTICS IN SCALABLE PARALLEL PROCESSING ARCHITECTURES INCLUDING CALCULATING CPU IDLE TIME AND COUNTING NUMBER OF CACHE MISSES

CROSS REFERENCE TO RELATED APPLICATION

This is a continuation of application Ser. No. 08/168,083 filed on Dec. 15, 1993, now abandoned.

TECHNICAL FIELD OF THE INVENTION

The present invention relates in general to processing systems and in particular to systems and methods for performing cache latency diagnostics in scalable parallel processing architectures.

BACKGROUND OF THE INVENTION

Processing system based diagnostics come in a number of flavors, and can best be defined as systems and methods designed to locate hardware and/or software performance problems. System diagnostics are currently available in one form or another for all stand alone mainframe, mini and personal computer systems. In general, diagnostics systems produce messages during the malfunctioning of a process activity. These messages identify the location of a software or hardware performance problem. The problem however, is that existing diagnostics systems fail to explain why a particular processing activity is malfunctioning. The existing problem is further compounded should the plurality of processing system nodes exist within a parallel processing environment.

In Reduced Instruction Set Computing (RISC) based architectures, a key cause of poor performance is memory accessing patterns which give rise to a large number cache misses. This anomaly is commonly known as "cache thrashing," which is the constant swapping of memory regions between a main memory and a cache. While accessing a cache requires less time than accessing main memory, whenever a cache miss occurs the processing system must request a memory region transfer from main memory to cache. If cache misses occur with regularity, cache latency problems are caused.

In multi-processor systems, cache thrashing is further aggravated because multi-processor systems by design have a greater number of opportunities for cache misses while attempting to access data. For example, a situation can arise where a first processor will encache a piece of data followed by a second processor requesting that same data, this causes the data to be evicted from the first processor's cache into the second processor's cache. Subsequently, the first processor may re-request that same data. What results is a "ping-pong" effect whereby data is bounced back and forth over a cache line from the first processor's cache to the second's. When evaluating processing activity, it is difficult to determine whether the processing system is running into typical cache thrashing or running into the "ping-pong" effect due to a multi-processor configuration. This problem is further compounded in parallel processing environments where the processing activity is distributed across multiple caches.

In multi-processor systems with non-uniform access times (latencies) to main memory, cache thrashing is further aggravated because a memory access to one part of memory make take significantly more or less time than an access to another part of memory. For example, an access to memory close to a processor may take one unit of time, while an access to memory far from a processor may take 50 units of time. Thus, accesses to memory far from the processor would idle a processor 50 times more than access to memory near to the processor. For performance diagnostics, it would be grossly misleading to count each of these memory accesses (i.e., cache misses) equally.

Accordingly, there exists a need in the art for a diagnostics system which provides a means for isolating and diagnosing processing system performance problems due to poor cache behavior.

There further exists a need in the art for a diagnostics system which is designed to monitor cache misses within a processing network supporting parallel processing.

Lastly, there exists a need in the art for a diagnostics system which is designed to monitor the time period during which a single processor within a multi-processor system is idle due to one or more memory accesses.

SUMMARY OF THE INVENTION

The foregoing problems have been solved through an arrangement whereby performance monitors count both cache misses and the time period during which one or more processors remain idle waiting on a memory reference. This cache miss information is temporarily stored and subsequently displayed graphically.

In one embodiment of the invention, a first performance monitor counts the number of cache misses over some period of time. The first performance monitor consists of a simple counter and a control signal provided to that counter whenever there is a cache miss, the control signal incrementing the counter to count the cache miss. A second performance monitor counts the number of clock cycles that a processor is blocked while waiting on an access to memory. In the preferred embodiment, the second performance monitor counts the cycles by gating the clock signal of the microprocessor into a counter that counts the number of clock cycles the processor sits idle waiting on a memory access. The first and second performance monitors therefore count cumulative cache misses and their associated latency to memory over an arbitrary period of time.

One aspect of the present invention is its ability to associate performance metrics with particular pieces of application source code. This is accomplished, with the help of a compiler, by instrumenting an application for profiling, i.e., the compiler divides the application into regions (either a routine, a loop, or a parallelized loop). At the beginning of any such region, the compiler will reserve in the instruction string a first point to place a call to the performance monitors. Further, at the end of any such region, the compiler will reserve a second point to place a call to the performance monitors. The application is enabled, and a user selects which routines, loops and parallel regions to instrument. The application is then instrumented by writing in a sequence of instructions to call to the appropriate performance monitor. Upon entry into any region, a performance monitor, either the latency monitor or the event monitor, or both, and upon execution, the value generated by the hardware performance monitors will be saved in some memory location. Upon exiting from that region, the performance monitor will grab the values in the latency and event monitors and subtract the values upon entry into the region to compute the cost in cache misses or in latency times for that region for whatever particular thread is running. A thread is defined as an independent execution stream or sequence of instructions that is fetched and executed by a CPU. These values are then added, and stored to a summation area maintaining the cost of a particular region over multiple invocations of those regions within the application. The forgoing steps/process/etc. is repeated over the life of the execution of the application. Subsequently, the profiling information will be stored to a data file, from which the information will be displayed.

In another embodiment of the invention, the performance monitor data is kept on a per thread basis. Thus, in parallel applications having multiple threads, the system will have performance monitoring information for these monitors on a per thread basis for each routine, loop or parallel region in the application selected for analysis. Given that information, then, the performance monitoring data can be displayed graphically in three dimensions. The number of cache misses, or the latency of the cache misses, can be displayed in one dimension, typically in the vertical, or Z, dimension. Information is also displayed for each region or routine that was analyzed in a second dimension, and individual thread information is displayed in a third dimension, creating a 3-D profile.

Accordingly, a first technical advantage of the invention is the ability to isolate and diagnose processing system performance problems due to poor cache behavior.

A second technical advantage of the invention is the ability to monitor cache misses within a processing network supporting parallel processing.

A third technical advantage of the invention is the ability to monitor the time period during which a single processor within a multiprocessor system is idle due to one or more memory accesses.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–6 of the drawings, in which like numbers designate like parts.

Figure 1:
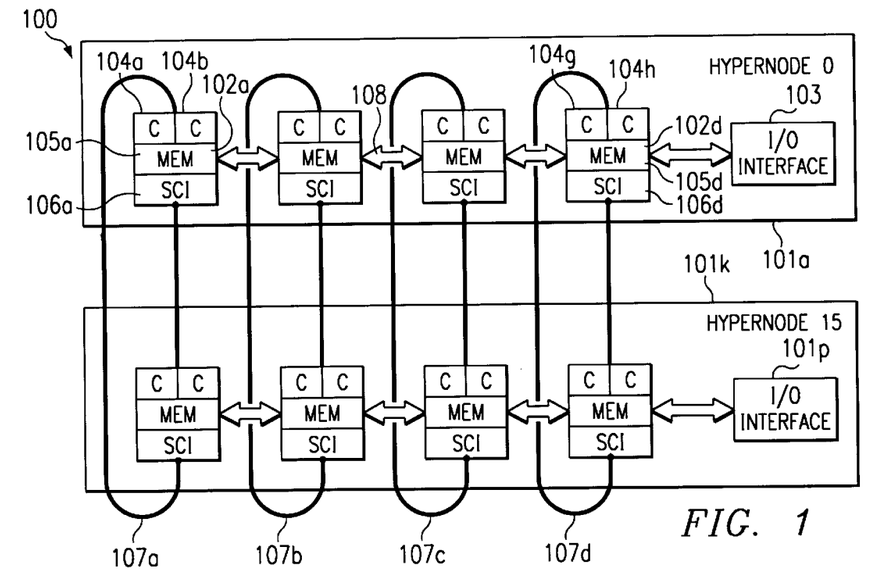
FIG. 1 illustrates a functional block diagram of a scalable parallel processing system implementation of massive parallel processing.

FIG. 1 is a functional block diagram of a scalable parallel processing (SPP) system implementation 100 of massive parallel processing (MPP) according to the principles of the present invention. For a more complete description of processing system 100 reference is now made to "Exemplar Architecture," Convex Part No. 081-023430-000, available from Convex Computer Corporation, 3000 Waterview Parkway, Richardson, Tex. 75080, such document describing the best mode of operation of system 100. Processing system 100 includes a plurality of hypernodes 101 which will be described in further detail below. In the illustrated embodiment, processing system 100 includes 16 hypernodes 101a–101p although in alternate embodiments the number of hypernodes 101 may vary widely depending on the size and application of system 100. In general each hypernode 101 includes a plurality of subprocessing blocks 102 and an I/O interface 103 coupled together by internal interconnection circuitry 108. In the illustrated embodiment, each hypernode 101 includes four subprocessing blocks 102a–102d although, as in the case of the hypernodes 101, the number of subprocessing blocks 102 may vary depending on the size and application of the design of system 100. In the illustrated embodiment each subprocessing block 102 generally includes a pair of central processing units ($CAV_5$) 104, memory 105 and a scalable coherent interface (SCI) 106.

In accordance with the principles of the present invention, the hypernodes 101 of system 100 are coupled together using one dimensional interface ring 107a–107d through the corresponding scalable coherent interfaces 106a–106d of the functional sub blocks 102a–d. Scalable coherent interfaces 106 and scalar coherent interface rings 107 in a preferred embodiment conform with IEEE standard 15696-1992 for scalable coherent interfaces. This standard generally defines an interface which provides a memory-address based, cache-coherent communication mechanism for massively parallel systems with large numbers of processors. Physically, the standardized scalable coherent interface is defined by a pair of 18-bit, differential ECL, uni-directional links clocked at 250 megahertz. Each link provides 16 bits of data along with a clock and a "flag" used as a framing delimiter for a total of 18 signals. Data is sampled on both the rising and falling edges of the clock for an equivalent 500 megahertz data rate for a 2-byte wide path, or a peak raw rate of 667 Mbytes/second. Since the standard does not define a specific interconnect, but rather interface to an interconnect, in the present invention SCI rings 107 are preferably uni-directional rings which are compatible with the point—point interface and the communications protocols.

In a preferred embodiment of the present invention, communication on the SCI rings 107 is in data packets containing a 16-bit destination hypernode identifier, a 16-bit source hypernode identifier, and a 48-bit address within the destination hypernode. The base protocol supports forward progress, delivery, fairness and basic error detection and recovery. The SCI coherency protocol, which is overlaid on the base protocol, provides a scalable link list form of coherency directory. The basic cache line size is fixed at 64 bytes and the base protocol is a write-back and invalidate type. The cache mechanism supports simultaneous linked list modification by all the processors in a sharing list for maximum concurrency. Advantageously, there are no locks and no resource choke points in the protocol, allowing it to scale in a linear manner to large numbers of processors. Further, if one SCI ring 107 fails, system 100 is capable of degraded operation with one to three of the remaining active SCI rings 107. It should be noted that in the illustrated embodiment, disabling an SCI ring 107 disables all the CPUs 104 and memories connected by that ring. Thus, disabling one ring 107 makes two CPUs 104 and one memory unit 105 of each hypernode 102 unavailable.

Figure 2:
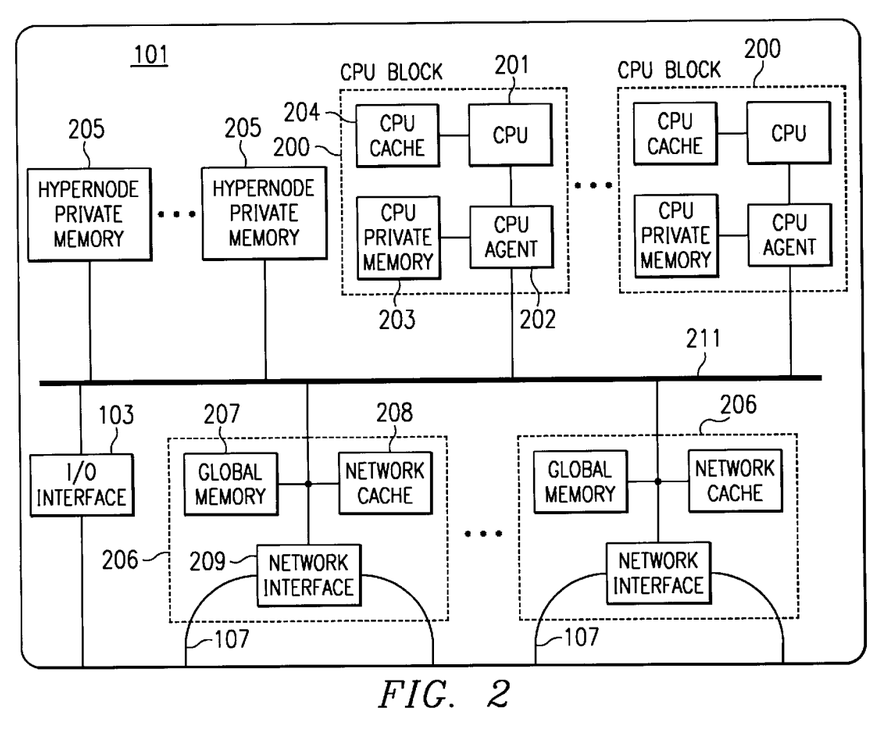
FIG. 2 illustrates a conceptual block diagram of a selected one of the hypernodes depicted in FIG. 1.

FIG. 2 is a conceptual block diagram of a selected one of the hypernodes 101 depicted in FIG. 1. In the illustrated embodiment, each hypernode 101 is organized as a symmetric multi processor (SMP) which advantageously exploits fine-grain parallelism. Conceptually, each hypernode 101 is divided into a plurality of central processing unit (CPU) blocks 200, each of which includes a central processing unit (CPU) 201, a CPU agent 202 which provides an interface between the CPU 200 hypernode interconnect 108, a CPU private memory 203, and a CPU data/instruction cache 204. In the illustrated embodiment, the CPU private memory 203 provides data storage only for the associated CPU 201 of the given CPU block 200 and is preferably implemented on the same board as the associated CPU 201 and has the lowest latency.

In the conceptual depiction of FIG. 2, each hypernode 101 also includes one or more hypernode-private memories 205. For illustrative purposes only, two hypernode-private memories 205a and 205b are shown, although the number may vary depending on the design and application of the corresponding hypernode 101. Hypernode-private memories 205 are provided for storage and retrieval of data shared only by the CPUs 201 within the given hypernode 101. In other words, the hypernode-private memory 205 of one hypernode 101 may not be accessed by the CPU's 201 of another hypernode 101. Preferably, when multiple hypernode-private memories 205 are used, such memories operate independently and are hardware interleaved to provide greater bandwidth.

Conceptually, each hypernode is further divided into a plurality of global memory blocks 206, a pair of which are depicted in FIG. 2 for illustrative purposes. Each global memory block 206 includes global memory 207, network cache 208, and a network interface 209. Global memory 206 provides global memory accessible by all hypernodes 101 in system 100, including the hypernode 101 actually containing that global memory 206. The network cache 207 encaches all global memory data imported by the corresponding network interface 106 from the other hypernodes 101 on the corresponding network or ring 107.

The CPU blocks 200, the hypernode-private memory 205, the global memory blocks 206 and the I/O adapter 103 are coupled together via the hypernode interconnect 108. Conceptually, the hypernode interconnect 108 is a trade off between latency, bandwidth, scalability, and cost. Preferably, to make the hypernode interconnect 108 effective, low latency to memory is required, which ultimately limits the number of supported CPUs blocks 200. Hypernode interconnect 108 may be implemented for example by a bus or crossbar connection.

It is important to note that the global memory 206 may be partitioned into near-shared memory and far-shared memory. The near-shared memory is globally accessible from all hypernodes 101, but has an affinity for its home hypernode 101. Accessing near-shared memory from any hypernode 101 other than the home hypernode 101 suffers a latency penalty. Preferably, the near-shared memory is allocated from the global memory 206 of the home hypernode 101. The far-shared memory is globally accessible from all hypernodes 101 and with equal latency from any hypernode 101 participating in a given application. A far-shared memory may be implemented as an interleaving of all near-shared memories of the hypernodes participating in the computation. Preferably, far-shared memory is allocated from the global memories 206 of several hypernodes 101. It should also be noted that all the hypernodes 101 participating in a given computation are not necessarily all the hypernodes within system 100. For example, the operating system may dynamically reconfigure the hypernodes 101 of system 100 to form a Sub-complex in which all the hypernodes are working on the same problem. In this case, far-shared memory is interleaved among all the hypernodes in a Sub-complex.

Networks 107 support access to global memory 206 on a cache line basis. A cache line is the size of memory moved over the networks 107 in response to load, store, or flush operations. It should be noted that the cache line size for the networks 107 may or may not be the same as the cache line size of CPUs 201. In a preferred embodiment, the network cache line size is 64 bytes while the CPUs 201 use a cache line size of 32 bytes. Cache lines and pages typically migrate between hypernodes 101 in system 100 without software intervention.

Figure 3:
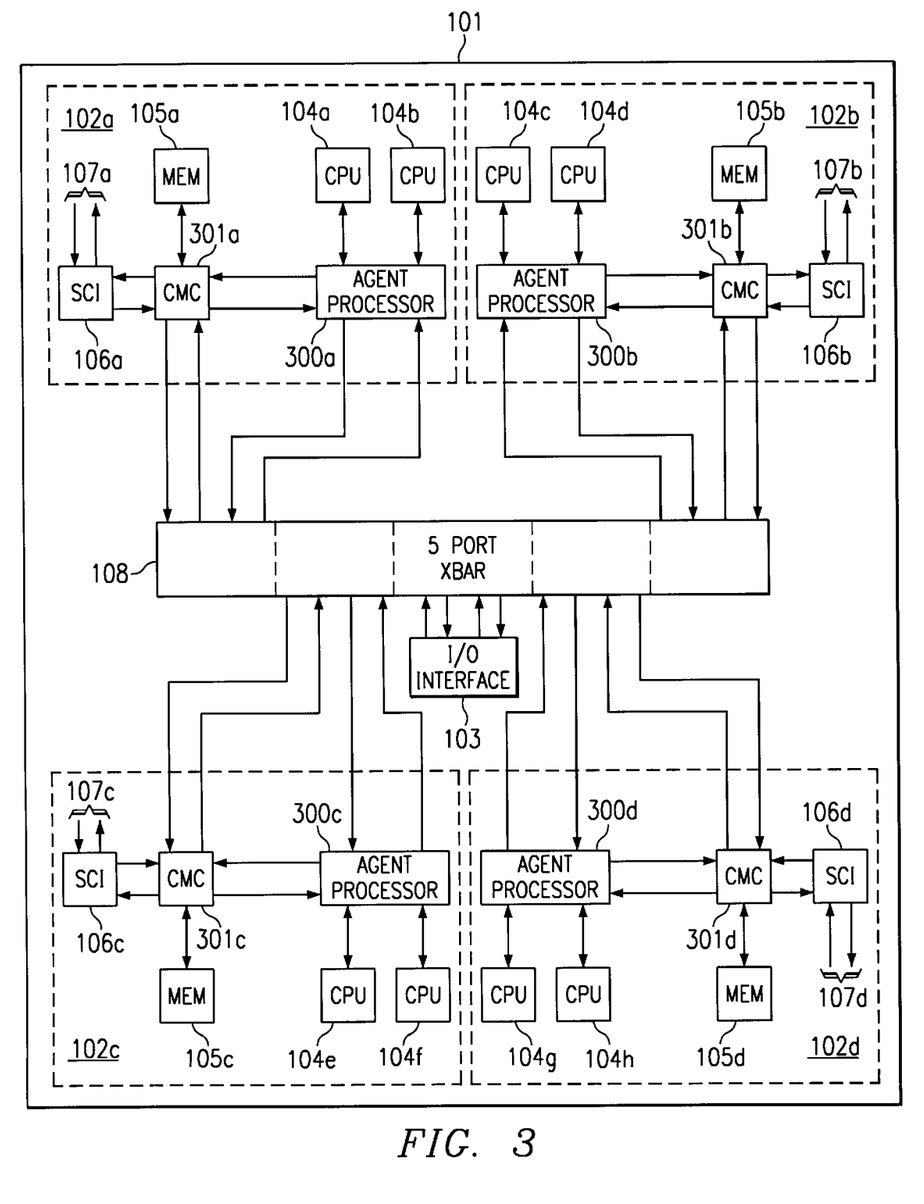
FIG. 3 illustrates a functional block diagram of a preferred implementation of a given one of the hypernodes depicted generally in FIG. 1 and conceptually in FIG. 2.

FIG. 3 is a functional block diagram of a preferred implementation of a given one of the hypernodes 101 depicted generally in FIG. 1 and conceptually in FIG. 2. In the embodiment illustrated in FIG. 3, the conceptual CPU blocks 200, global memory blocks 206 and hypernode-private memory 205 of FIG. 2 have been combined into the functional processing units 102a–102d depicted generally system diagram of FIG. 1. In the embodiment of FIG. 3, two CPUs 104 share a single agent 300. In the preferred embodiment, CPUs 104 are Hewlett-Packard 7100 PA-RISC processors. Each memory block 105 holds hypernode-private memory data, global memory data, and network cache data, discussed above in connection with FIG. 2, in a single set of memory devices. In the preferred embodiment, the CPU-private memory is not physically implemented but instead the operating system partitions hypernode-private memory for use as CPU-private memory by the CPUs 104. In the embodiment of FIG. 3, the CPU caches, shown separately as blocks 204 in conceptual FIG. 2, are internal (on board) to CPUs 104.

In the embodiment of FIG. 3, hypernode interconnect 108 comprises a 5-port crossbar which maximizes bandwidth and minimizes CPU to memory latency. As discussed above, the network interfaces 106, conceptually shown by blocks 209 in FIG. 2, are implemented with a scalable coherent interface (SCI). Again, each hypernode 101 has four SCI interfaces 106a–106d for coupling with the other hypernodes 101 via the four network rings 107a–107d. In the illustrated embodiment, one interface 106 is associated with each functional block 102.

In a preferred embodiment, the four memories 105 and of each hypernode 101 are interleaved to provide higher bandwidth and less contention accessing a single memory. In the illustrated embodiment, the interleaving is performed by sequential memory references (by linearly descending physical addresses) which search the four memories 105 on a round-robin basis. Each memory 105 returns 64 bytes for sequential reads.

Communications between the CPUs 104, the network rings 107 (through interfaces 106), and the memories 105 are controlled by the coherent memory controller gate array.

Memory banks 105 are preferably implemented as dynamic random access memory (DRAM) banks. According to a preferred embodiment, the main memory of a given bank 105 is partitioned by the physical addresses provided by the CPUs 104 into two sections, one section used as main memory and the other as network cache. This advantageously reduces costs, avoids the overhead of separate memory control, interfaces, and buses that are normally required in conventional systems where the network cache and main memory are implemented by separate memory systems.

The network cache 207 maintains a cache sent on the network's (rings) 107 to the other hypernodes 101 in system 100. Any network data that has been moved into and maintained by the CPU cache 204 on the same hypernode is also encached in the network cache. Consequently, the direct network cache directory information can be used to locate any global data currently encached by a given hypernode 101. The network cache is physically indexed and tagged with a global physical address. In a preferred embodiment, the network cache line size is 64 bytes.

It should be noted at this time that system 100 ensures cache coherence between the multiple hypernodes 101 such that two or more hypernodes 101 that mapped the same global address have a consistent view of the stored data. In general, cache coherence is maintained by a linked sharing list that contains a list of all the hypernodes 101 sharing each cache line or the hypernode that exclusively owns a given cache line. Within every hypernode, a record is kept of which CPUs 201 having cached each lined in the network cache so that network coherency requests can be forwarded to the appropriate CPUs 204.

According to further principles of the present invention, memory of a given hypernode 101 is interleaved across the four memory banks 105 using the four separate coherent memory controllers 301. The interleaving is arranged so that when a given CPU 104 provides a sequence of physical addresses to access a large block of memory, a 64-byte slice is provided by each coherent memory controller 301 in alternation. In this fashion, a sequential access of a large block of memory will result in nearly equal accesses to each memory bank 105 (both main memory and network cache) through the associated coherent memory controller 301. Interleaving, according to the principles of the present invention, effectively increases the band width that can be provided by the network cache. A further benefit of interleaving the network cache according to the principles of the present invention, is that such interleaving splits the remote memory traffic for remote sequential physical memory accesses across the interconnection networks of the four functional blocks 102 in a nearly equal fashion allowing all independent interconnection networks to be utilized for further increased bandwidth. Additionally, the interleaved network cache according to the principles of the present invention allows the coherency traffic (i.e., the messages used to keep the coherency state information consistent between nodes) for any given memory line is restricted to a single interconnection network, thus limiting coherency interactions to 1/4 (i.e., 1 over the interleave factor) of the coherent memory controllers 301, the network caches, and the interconnection networks of each of the functional blocks 102.

According to a further aspect of the present invention, the network cache also serves as a secondary cache for the CPUs 104. In the preferred embodiments each CPU 104 includes an internal (primary) one megabyte of instruction and data cache. These internal caches are direct mapped such that certain bits of the virtual address generated by the program controlling system 100 are used by the CPUs 104 to directly index into the primary cache, selecting one of 32,768 cache lines of 32 bytes. It should be noted that multiple virtual addresses map to the primary cache line and in particular, any two virtual addresses that differ only in bits not used to index the cache. A CPU 104 must "cast out" a line from the primary cache if that CPU 104 needs to access a different (conflicting) address which maps to the same cache line. Alternate references between two conflicting cache lines can be a performance detriment.

The network cache scheme according to the principles of the present invention ameliorates the problem of conflicting cache lines. First, the network cache provides a bigger secondary direct mapped cache for networked accesses. In general, the size of the network cache will be considerably larger than the internal cache of a given CPU 104, and is preferably designed to be larger than the sum of all the primary (internal) caches of all the CPUs 104 of a given hypernode 101. Second, the network caches are physically indexed, rather than virtually indexed. Therefore, since there is in general no one to one correspondence between virtual addresses and physical addresses (as the operating system imposes a certain degree of randomness on this mapping) the secondary cache provided in the network cache will have different sets of conflicting addresses from those of the internal caches in the CPUs 104.

Depending on the particular coherency and network protocols, and on the constraints of the type of CPUs 104 used, the cache line size within a given hypernode 101 may differ from that of the interconnection network. In particular, the Hewlett-Packard PA-RISC CPUs used in the preferred embodiment of the present invention operate on 32-byte cache lines, whereas the SCI network rings 107 operate on 64-byte cache lines. The network cache embodying the principles of the present invention advantageously provides the ability to bridge the different cache line sizes by providing buffering for the larger network cache lines, even if a given CPU 104 only needs the first 32 bytes or the last 32 bytes. Additionally, according to the present invention, different CPUs 104 within a hypernode 101 can have private access to the first 32 bytes and the last 32 bytes within a 64 byte network cache line concurrently.

In the development of SPP systems, one of the system architecture design approaches which has evolved is a parallel system architecture that employs a given amount of memory local to each processor. While this approach has substantial advantages, that memory which is local to one processor is relatively far removed in time from another processor. This gives rise to non-uniform memory access times for a particular processor depending on whether the memory is local to that processor or resident in another system or subsystem. In other words, a given processor will access memory local to its own system or subsystem relatively quickly, however, when accessing memory local to another processor's system or subsystem, more time will be required to complete the operation. Accordingly, when evaluating system performance, it remains useful to count cache misses in the identification of causes of poor performance, this is generally not sufficient since cache misses will cost different amounts of time. Therefore, in addition to designing a performance monitor to count cache misses, it is also important to design a monitor which also measures the amount of time (the latency) that a processor spends waiting on memory since some accesses are short, because they are directed to local memory, and some accesses are long because they are directed to non-local memory. In sum, in addition to counting cache misses, an integrated latency monitor is required which, in the preferred embodiment of the invention, counts the number of CPU clock cycles over which a CPU is idle while waiting on a memory reference resulting from a cache miss.

Figure 4:
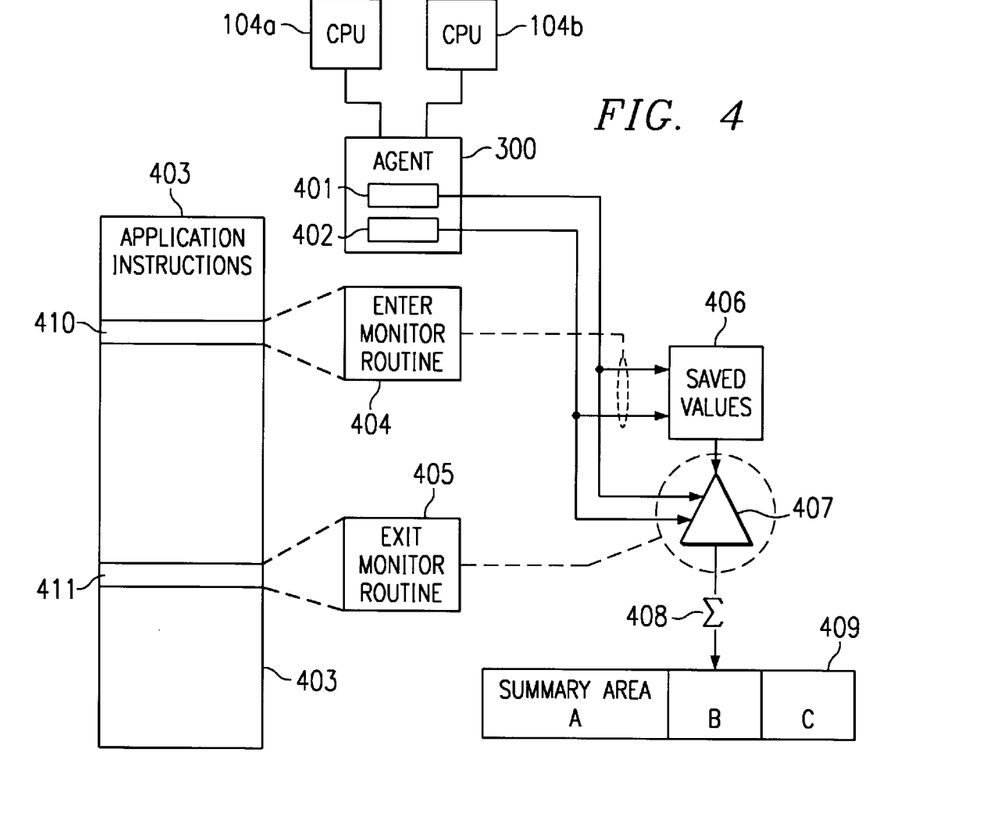
FIG. 4 illustrates a conceptual block diagram of cache latency diagnostics for use in scalable parallel processing system architectures.

FIG. 4 illustrates a conceptual block diagram of cache latency diagnostics for use in SPP architectures according to the principles of the present invention. Illustrated are two selected CPUs 104 which are coupled with a selected agent 300, agent 300 providing an interface between CPUs 104 and the remainder of processing system 100 through the corresponding crossbar 108, coherent memory controller 301, and scalable coherent interface 106 (see FIG. 3). Agent 300 includes a latency monitor 401 and an event monitor 402. In the illustrated embodiment, monitors 401 and 402 are sampled by monitor routines 404 and 405 which are linked into application 403. Application 403 is comprised of a plurality of instructions residing within the file systems, which are stored in memory 105 and are controlled by the operating system. In accordance with the teachings of the present invention, particular instruction points 410 and 411 within the instruction stream of application 403 have been reserved for system calls to either monitor routines 404 or 405.

In the preferred embodiment, application 403 is marked for cache latency diagnostics analysis. Application 403 is passed to a compiler (not shown), the compiler is an executable software routine which resides on the file system. The compiler instruments application 403 by inserting No-Ops at the entry point or exit point of each region in application 403. A region is either a compiler generated software loop, routine or a parallel region. A parallel region is a loop parallelized by the compiler or section of code that is designated to run in parallel. The compiler is directed to instrument application 403 by a user specifying a compiler flag.

To summarize, the compiler inserts No-Ops into the instruction stream at the entry and exit of every region in the files that are being compiled for analysis. No-Ops are instruction statements that do not perform any function in and of themselves, but instead, are inserted into the executable code to reserve space for calls to monitor routines 404 and 405. Once the files in application 403 are compiled the files are linked together with monitor routines 404 and 405. Once application 403 has been instrumented for diagnostics, application 403 is run under a diagnostic profile control. A diagnostic profile control is a program used to control running, execution and instrumentation of an application undergoing diagnostic evaluation. Application 403 is stopped at the first instruction of the application, at which time, the diagnostic profile control writes a sequence of instructions needed to call a monitor routine 404 or 405 in place of the No-Op instruction reserved by the compiler. This happens for every region enabled for diagnostics in the application. During the execution of application 403, calls will be made to monitor routines 404 and 405. Entry monitor routine 404 samples the latency and/or event data being generated by performance monitors 401 and/or 402, saving the sampled values to a predetermined memory location 406, which is located within main memory. In the preferred embodiment, predetermined memory location 406 is a stack. A stack is a region of reserved memory in which status data is stored on a "last in, first out" basis (LIFO). The saved sampled values remain stored until exit monitor routine 405 is called, at which time, exit monitor routine 405 outputs current sampled values to difference operation 407. Difference operation 407 subtracts the sampled values of monitors 401 and 402 at the end of a region from the saved values from the beginning of the region, which are stored in memory location 406. The net effect is to compute the cache misses and latencies attributable to the execution of the region. The net cache misses and latencies are then summed via a summation area 408. Summation area 408 stores the result, in this example, in region B of summary area 409, thereby accumulating the total number of cache misses and latency times for that region. Summation area 408 and summary area 409 are found in thread specific memory. Accumulation is done on a thread-by-thread basis for all threads executing within CPUs 104, this process being replicated for every thread in the application, i.e., from thread(1) to thread("n"). Summary area 409 is partitioned into sub-areas, with one subarea for each region sampled for analysis. There is a separate summation area for each thread within application 403 which provides a base mechanism to collect summation information for each region on a per thread basis.

Figure 5:
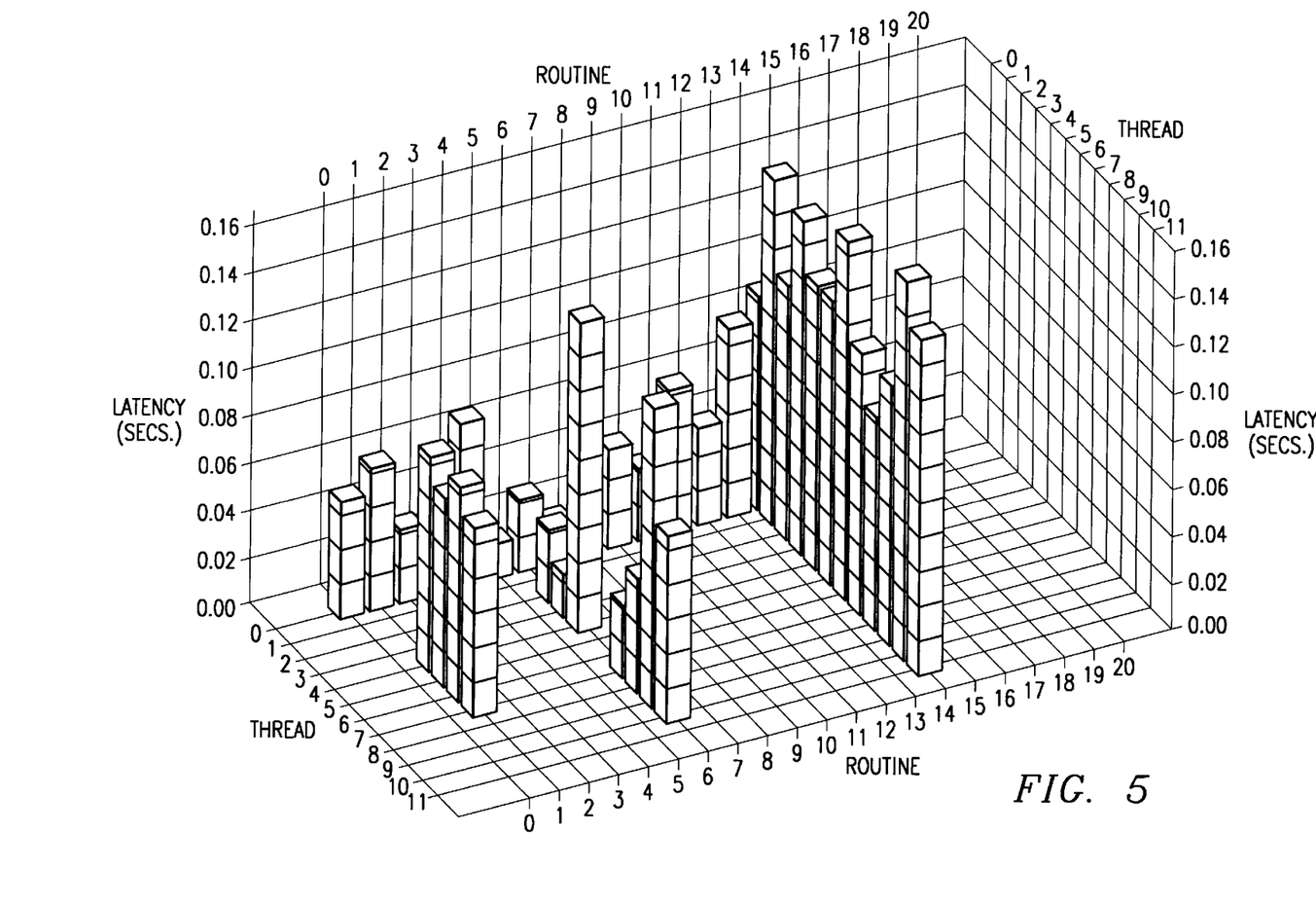
FIG. 5 illustrates a three dimensional per thread per file graphical display according to the principles of the present invention.

Since a thread runs on a single CPU 104, as the thread moves from a first CPU 104 to a second CPU 104, the state associated with the thread, which will include the state of the first CPU 104, will also migrate to the second CPU 104 with the thread. At the end of the execution of application 403 the contents of summary area 409 are saved to a data file, which in the preferred embodiment would be found in the file system. Movement of the thread from the first CPU 104 to the second CPU 10 is triggered by preemptive scheduling by the operating system. The contents of the data file are then output in either textual or graphical form, as shown in FIG. 5.

The illustrated embodiment provides means for measuring the following key parameters in each of the following areas:

Cache-misses—provides data on overall cache misses, cache misses per CPU, cache misses over time, average latency per cache miss, and data that tells which application 403 instructions are causing the most misses.

Memory communication costs—includes communication within and across hypernodes 101, concerns in communication include the ratio of local-to-global memory use, the memory access frequencies of particular application 403 sections.

Network cache hits, network cache misses, network cache hit ratios, hits, misses or hit ratios over time.

To compute things over time one must collect the wall clock time (or possibly CPU time) along with the cache diagnostics.

FIG. 5 illustrates a three dimensional per thread per file graphical display according to the principles of the present invention. In the first dimension, the vertical dimension, there is displayed a performance metric that was gathered during execution of an application under the cache latency diagnostics system for scalable parallel processing architectures. In the illustrated display, the possible values of the latency performance monitor are shown, which could also be the values of the event performance monitor. In the second dimension, the X dimension, performance data is shown on a routine-by-routine basis. In this case, routines are used and numbered 0–20. In the third dimension, the Y dimension, the various threads of application 403 are displayed. For each region performance data is shown on a per thread basis. For each thread there is one value of latency shown for each region. In one embodiment, to aid in identifying the approximate value of latency, the bars are color coded, such that consecutively higher values are coded in different colors indicating their approximate latency value. Therefore, one could set a level of latency that one could tolerate in a system, review the system and take action with respect to values that are outside the spectrum of tolerable colors.

Figure 6:
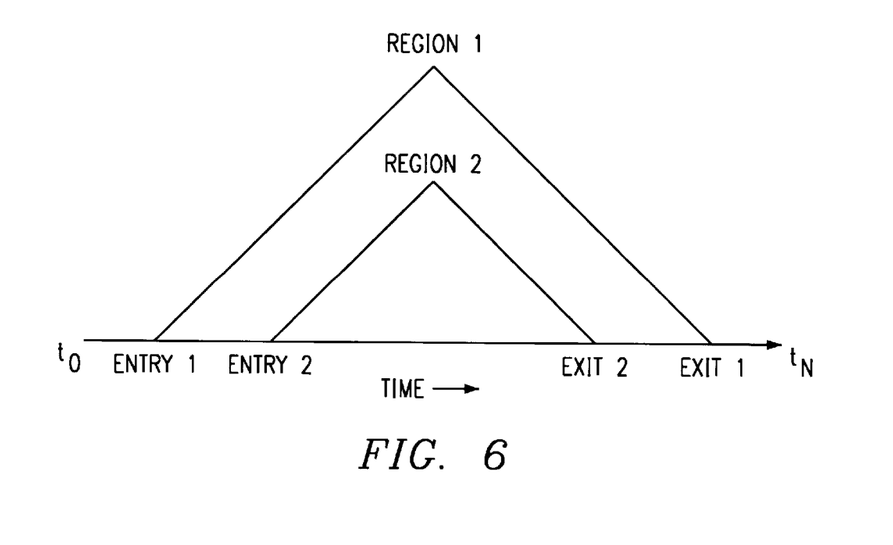
FIG. 6 illustrates dynamic nesting of a second region within a first region of an application having embedded calls to the Monitor Routines of FIG. 4.

FIG. 6 illustrates the dynamic nesting of a second region within a first region of application 403 having embedded calls to Monitor Routines 404 and 405 according to the principles of the present invention. Increasing time is shown in the horizontal direction moving from left to right. The vertical direction indicates the recursive nesting of the second region within the first region. The first entry into the first region is indicated by Entry 1 404a invocation of the region. A later entry to the second region is indicated by Entry 2 404b invocation of the region. Next, the invocation of the second region is exited for the first time, Exit 2 405b, and then finally the invocation of the first region is exited, Exit 2 405a. A stack is required to save the values of the performance monitors on entry to each recursive invocation of a region. On the ith entry to a region, the current value of the latency timer is saved on the ith level of the stack, the event count is saved on the ith level of the stack, and the size of the stack is incremented by one. On exit from the region, as previously introduced, the illustrated embodiment will accumulate into summary area 409 the current value of the latency performance monitor and subtract the previously saved value for the ith position of the stack. This same type of calculation is followed for the event counter, and then the stack is popped by subtracting 1 from the current depth of the stack, i.

Computation of the diagnostics in this manner will result in "inclusive" diagnostics. That is, the diagnostic for memory latency or events is computed across the entire lifetime of the region. For REGION 1 in FIG. 5 this would include all memory accesses from ENTRY 1 to EXIT 1. However, it is sometimes desirable to be able to compute diagnostics for a particular region that exclude any diagnostics measured in regions that are (temporally) nested inside/during the particular region. Such diagnostics are referred to as exclusive diagnostics. For example, in FIG. 5 the exclusive diagnostics due solely to REGION 1 would consist of any memory access from ENTRY 1 to ENTRY 2 and from EXIT 2 to EXIT 1.

To compute exclusive diagnostics requires a few extra computations depending on the type of regions. For routines it is necessary to reserve extra space CUMULATIVE NESTED DIAGNOSTICS (for each diagnostic) in the SAVED VALUES area (406 in FIG. 4) to contain the cumulative amount of inclusive diagnostics of any nested routines. Upon entry to a routine, the caller, that may call another nested routine, the callee, the ENTER MONITOR ROUTINE (404) initializes CUMULATIVE DIAGNOSTICS to zero. During execution of the EXIT MONITOR ROUTINE (405) for any callee, the inclusive time for the routine is added to the CUMULATIVE DIAGNOSTICS of the caller. This will allow the total time of any nested routine to be computed for a caller. During invocation of the 405 EXIT MONITOR ROUTINE of a caller, CUMULATIVE NESTED DIAGNOSTICS will be saved to the summary area. In report or graph generation for a routine the exclusive diagnostics for the routine can be presented by simply subtracting the CUMULATIVE NESTED DIAGNOSTICS from the cumulative diagnostics for the routine.

For loop the situation is different as the loop nesting structure is static. During report or graph generation it is known which loops are nested inside what loops. Exclusive diagnostics for an enclosing loop can be computed by simply subtracting the cumulative diagnostic of an enclosing loop. For example, in the nested loop below, $$\begin{aligned} &\text{DO} \quad I = 1, m \\ &\qquad \text{DO } J = 1, n \\ &\qquad \text{ENDO} \\ &\text{ENDO} \end{aligned}$$

The exclusive diagnostic for the outer I loop can be computed by subtracting the inclusive diagnostic of the inner J loop from the inclusive diagnostic of the I loop.

In alternate embodiments of the present invention, the cache latency diagnostics system for scalable parallel processing architectures is configured to count various types of cache misses. In one embodiment, the performance monitors are configured to count only cache misses to local memory. In a second embodiment, the performance monitors are configured to count cache misses to remote memory on a distant hypernode 101. In a third embodiment, the performance monitors are configured to direct which cache misses to count based on whether the miss was generated for a write request or for a read request. In a fourth embodiment, the performance monitors are configured to count network cache misses. Accordingly, in addition to selecting local references, non-local references, reads or writes, the present invention can count either misses or hits to the network cache, count all cache misses, can restrict misses to those misses through a read or a write, can differentiate between local and non-local memory references, providing broad flexibility in the selection of cache misses to count.

Although the present invention and its advantages have been described in detail, it should be understood that various changes, substitutions and alterations can be made herein without departing from the spirit and scope of the invention as defined by the appended claims.

What is claimed is:

1. A diagnostics system for use in a parallel processing system, said parallel processing system including a plurality of processors and a plurality of memory units, said plurality of processors operable to read one or more addressable memory locations within said plurality of memory units, said diagnostics system comprising:

a first monitor for counting cache misses suffered by one or more of said plurality of processors waiting to access said plurality of addressable memory units, wherein said cache misses occur at both local and remote addressable memory units;

a second monitor, integrated with said first monitor, for counting idle time suffered by one or more of said plurality of processors waiting to access said plurality of addressable memory units;

means for reporting an amount of cache misses counted by the first monitor to a user of the diagnostics system; and means for reporting an amount of idle time counted by the second monitor to a user of the diagnostics system;

wherein each memory of said plurality of memory units is associated with a particular processor of said plurality of processors, said particular processor is operable to access memory units associated with other processors of the plurality of processors.

2. A diagnostic system for determining performance metrics of an application executing on a parallel processing system, said parallel processing system including a plurality of processors and a plurality of memories, each memory of said plurality of memories associated with a particular processor of said plurality of processor, said diagnostic system comprising:

means for instrumenting a code region of said application; and means for monitoring performance metrics for said instrumented code region, said means for monitoring comprising:

first means for tracking memory cache misses incurred by at least one processor of said plurality of processors in accessing said plurality of memories, wherein said memory cache misses occur at both local and remote memories; and second means for tracking idle time incurred by said one processor from waiting to access said plurality of memories;

wherein said mean for monitoring determines said idle time by gating a clock signal of said one processor into a counter, and determines cache misses by causing a control signal to increment said counter.

3. The diagnostic system of claim 2, wherein said means for monitoring only counts said memory cache misses local to said one processor.

4. The diagnostic system of claim 2, wherein said means for monitoring only counts said memory cache misses remote from said one processor.

5. The diagnostic system of claim 2, wherein said means for monitoring determines said performance metrics for a particular thread of said application.

6. The diagnostic system of claim 2, wherein the performance monitoring means further comprises:

means for reporting an amount of cache misses tracked by the first monitor; and means for reporting an amount of idle time tracked by the second monitor.

7. The diagnostic system of claim 2, wherein:

the particular processor can access memories associated with other processors of the plurality of processors.

8. A diagnostics system for use in a parallel processing system, said parallel processing system including a plurality of processors and a plurality of memory units, said plurality of processors operable to read one or more addressable memory locations within said plurality of memory units, said diagnostics system comprising:

a first monitor for tracking cache misses incurred by at least one processor of said plurality of processors in accessing said plurality of addressable memory units, wherein said cache misses occur at both local and remote addressable memory units; and a second monitor, integrated with said first monitor, for tracking idle time incurred by said one processor from waiting to access said plurality of addressable memory units;

means for reporting an amount of cache misses tracked by the first monitor; and means for reporting an amount of idle time tracked by the second monitor;

wherein each memory of said plurality of memories is associated with a particular processor of said plurality of processors, said particular processor is operable to access memories associated with other processors of the plurality of processors.

9. The diagnostic system of claim 8, wherein said first monitor tracks said cache misses by causing a control signal to increment a counter.

10. The diagnostic system of claim 8, wherein said first and second monitors track said cache misses and said idle time for a particular code region of an application executing on said parallel processing system.

11. The diagnostic system of claim 8, wherein said first and second monitors track said cache misses and said idle time for a particular thread of an application executing on said parallel processing system.

12. The diagnostic system of claim 8, wherein said first monitor only counts said cache misses local to said one processor.

13. The diagnostic system of claim 8, wherein said first monitor only counts said cache misses remote from said one processor.

14. The diagnostic system of claim 8, wherein said second monitor tracks said idle time by gating a clock signal of said one processor into a counter.

15. A method of determining performance metrics in a parallel processing system having a plurality of processors and a plurality of memories, each memory of said plurality of memories associated with a particular one of said plurality of processors, said plurality of processors operable to read one or more addressable memory locations within said plurality of memories, comprising the steps of:

tracking cache misses incurred by at least one processor of said plurality of processors in accessing said plurality of addressable memory units, wherein said cache misses occur at both local and remote addressable memory units; and tracking idle time incurred by said one processor from waiting to access said plurality of addressable memory units;

wherein said step for tracking idle time tracks said idle time for (a) a particular code region of an application, and (b) a particular thread of and application executing on said parallel processing.

16. The method of claim 15, wherein said step for tracking cache misses only tracks cache misses local to said one processor.

17. The method of claim 15, wherein said step for tracking cache misses only tracks cache misses remote from said one processor.

18. The method of claim 15, further comprising the steps of:

accessing, by the particular processor, the memory associated with the particular processor; and accessing, by the particular processor, a memory associated with another processor of the plurality of processors.

19. The method of claim 15, further comprising the steps of:

reporting an amount of cache misses tracked by the first monitor; and reporting an amount of idle time tracked by the second monitor.

* * * * *